(12) United States Patent
Taga et al.

(10) Patent No.: US 11,787,451 B2
(45) Date of Patent: Oct. 17, 2023

(54) AXLE BOX SUSPENSION AND ELASTIC BUSHING SHAFT BODY FOR USE IN RAILCAR

(71) Applicant: KAWASAKI RAILCAR MANUFACTURING CO., LTD., Kobe (JP)

(72) Inventors: Yukitaka Taga, Kobe (JP); Yasufumi Okumura, Kobe (JP); Fumikazu Kounoike, Kakogawa (JP)

(73) Assignee: KAWASAKI RAILCAR MANUFACTURING CO., LTD., Kobe (JP)

( * ) Notice: Subject to any disclaimer, the term of this patent is extended or adjusted under 35 U.S.C. 154(b) by 531 days.

(21) Appl. No.: 17/043,997

(22) PCT Filed: Mar. 25, 2019

(86) PCT No.: PCT/JP2019/012428
§ 371 (c)(1),
(2) Date: Sep. 30, 2020

(87) PCT Pub. No.: WO2019/188949
PCT Pub. Date: Oct. 3, 2019

(65) Prior Publication Data
US 2021/0031816 A1 Feb. 4, 2021

(30) Foreign Application Priority Data
Mar. 30, 2018 (JP) .................. 2018-066963

(51) Int. Cl.
*B61F 5/30* (2006.01)
*B61F 5/32* (2006.01)
*F16F 1/387* (2006.01)

(52) U.S. Cl.
CPC .............. *B61F 5/305* (2013.01); *B61F 5/325* (2013.01); *F16F 1/387* (2013.01)

(58) Field of Classification Search
CPC ...... B61F 3/02; B61F 5/00; B61F 5/30; B61F 5/302; B61F 5/305; B61F 5/32;
(Continued)

(56) References Cited

U.S. PATENT DOCUMENTS 8,297,199 B2 * 10/2012 Nishimura ................ F16F 1/38
105/218.1
2011/0253004 A1 10/2011 Nishimura et al.
(Continued)

FOREIGN PATENT DOCUMENTS

JP S51-110222 U 9/1976
JP 2000-225941 A 8/2000
(Continued)

*Primary Examiner* — Zachary L Kuhfuss
*Assistant Examiner* — Cheng Lin
(74) *Attorney, Agent, or Firm* — Oliff PLC

(57) ABSTRACT

An elastic bushing includes a recess at a portion of an outer peripheral surface of the elastic bushing which portion is located at an inner side in a car longitudinal direction, the recess being recessed outward in the car longitudinal direction. A tubular portion of an axle beam includes a convex stopper portion protruding outward in the car longitudinal direction from a part of an inner peripheral surface of the tubular portion which part is located at the inner side in the car longitudinal direction, the stopper portion being inserted into the recess with a gap between the stopper portion and a bottom surface of the recess. A thickness of the elastic bushing at the recess in a radial direction is equal to or less than half a thickness of a portion of the elastic bushing in the radial direction which portion is located adjacent to the recess.

7 Claims, 6 Drawing Sheets

CAR LONGITUDINAL DIRECTION

(58) Field of Classification Search
CPC .... B61F 5/325; B61F 5/50; B61F 5/52; B61F 15/20; F16F 1/387; F16F 1/3828
See application file for complete search history.

(56) References Cited

U.S. PATENT DOCUMENTS

2014/0144347 A1* 5/2014 Nishimura ................ B61F 5/52
105/197.05
2017/0355387 A1 12/2017 Otsubo et al.

FOREIGN PATENT DOCUMENTS

| JP | 2000225941 A | * | 8/2000 | ................ B61F 5/30 |
|---|---|---|---|---|
| JP | 2002211395 A | * | 7/2002 | ................ B61F 5/50 |
| JP | 2014-020487 A | | 2/2014 | |
| JP | 2014020487 A | * | 2/2014 | |
| JP | 2015-168397 A | | 9/2015 | |
| JP | 2015168397 A | * | 9/2015 | |
| JP | 2017-043142 A | | 3/2017 | |
| JP | 2017043142 A | * | 3/2017 | ................ B61F 5/30 |

* cited by examiner

AXLE BOX SUSPENSION AND ELASTIC BUSHING SHAFT BODY FOR USE IN RAILCAR

TECHNICAL FIELD

The present invention relates to an axle box suspension and an elastic bushing shaft body, each of which couples an axle box to a bogie frame of a bogie of a railcar including a wheel tread brake configured to press a wheel tread of a wheel from an inner side in a car longitudinal direction.

BACKGROUND ART

Known as an axle box suspension of a railcar bogie is an axle beam type axle box suspension. In the axle beam type axle box suspension, a rubber bushing into which a core rod ins inserted is inserted into a tubular portion of an axle beam projecting from an axle box, and both end portions of the core rod which portions protrude from the rubber bushing are coupled to a bogie frame. In some cases, it is preferable that a spring constant of the rubber bushing be small from the viewpoint of travelling performance. When the wheel tread brake operates, the wheel is strongly pushed outward in a car longitudinal direction, and with this, the axle beam is largely displaced outward in the car longitudinal direction relative to the core rod. Therefore, when the spring constant of the rubber bushing is small, the rubber is largely distorted. On this account, in order to secure the durability of the rubber, a rubber bushing in which a displacement suppressing mechanism is incorporated has been proposed (see PTL 1).

CITATION LIST

Patent Literature

PTL 1: Japanese Laid-Open Patent Application Publication No. 2017-43142

SUMMARY OF INVENTION

Technical Problem

According to the configuration of PTL 1, the displacement suppressing mechanism is provided inside the rubber bushing. Therefore, the structure of the rubber bushing becomes complex, and the cost for components increases.

An object of the present invention is to provide an axle beam type axle box suspension which: prevents excessive distortion of an elastic bushing in a car longitudinal direction, the elastic bushing being interposed between an axle beam and a core rod; and suppresses an increase in cost.

Solution to Problem

An axle box suspension of a railcar according to one aspect of the present invention is an axle box suspension coupling an axle box to a bogie frame of a bogie including a wheel tread brake configured to press a wheel tread of a wheel from an inner side in a car longitudinal direction. The axle box suspension includes: an axle beam including a beam portion and a tubular portion and coupling the axle box to the bogie frame, the beam portion extending in the car longitudinal direction from the axle box, the tubular portion being provided at a tip end of the beam portion and open toward both sides in a car width direction; a core rod inserted into an internal space of the tubular portion and including a pair of protruding portions, the pair of protruding portions protruding toward both sides in the car width direction and being supported by the bogie frame; and a tubular elastic bushing interposed between the tubular portion and the core rod. The elastic bushing includes a recess at a portion of an outer peripheral surface of the elastic bushing which portion is located at the inner side in the car longitudinal direction, the recess being recessed outward in the car longitudinal direction. The tubular portion includes a convex stopper portion protruding outward in the car longitudinal direction from a part of an inner peripheral surface of the tubular portion which part is located at the inner side in the car longitudinal direction, the stopper portion being inserted into the recess with a gap between the stopper portion and a bottom surface of the recess. A thickness of the elastic bushing at the recess in a radial direction is equal to or less than half a thickness of a portion of the elastic bushing in the radial direction which portion is located adjacent to the recess.

According to the above configuration, when the wheel is pushed outward in the car longitudinal direction by the operation of the wheel tread brake, and with this, the axle beam is about to be largely displaced outward in the car longitudinal direction relative to the core rod, the tip end surface of the stopper portion of the tubular portion of the axle beam presses the bottom surface of the recess of the elastic bushing to receive reaction from the core rod inward in the car longitudinal direction. This limits excessive displacement of the axle beam outward in the car longitudinal direction relative to the core rod during the operation of the wheel tread brake, and also prevents excessive distortion of the elastic bushing. The stopper portion is provided at the tubular portion of the axle beam and is higher in strength than the elastic bushing. Therefore, even when the stopper portion and the elastic bushing contact each other, the elastic bushing which is lower in cost than the stopper portion can serve as a damaged portion. Moreover, since the structure of the elastic bushing is not complex, an increase in cost is suppressed. Therefore, excessive distortion of the elastic bushing, interposed between the axle beam and the core rod, in the car longitudinal direction can be prevented, and the increase in cost can be suppressed.

An axle box suspension of a railcar according to another aspect of the present invention is an axle box suspension coupling an axle box to a bogie frame of a bogie including a wheel tread brake configured to press a wheel tread of a wheel from an inner side in a car longitudinal direction. The axle box suspension includes: an axle beam including a beam portion and a tubular portion and coupling the axle box to the bogie frame, the beam portion extending in the car longitudinal direction from the axle box, the tubular portion being provided at a tip end of the beam portion and open toward both sides in a car width direction; a core rod inserted into an internal space of the tubular portion and including a pair of protruding portions, the pair of protruding portions protruding toward both sides in the car width direction and being supported by the bogie frame; and a tubular elastic bushing interposed between the tubular portion and the core rod. The axle beam includes a stopper portion opposed in the car longitudinal direction to the core rod or a part of the bogie frame from the inner side in the car longitudinal direction with a gap between the stopper portion and the core rod or between the stopper portion and the part of the bogie frame. A size of the gap in the car longitudinal direction is smaller than a thickness of the elastic bushing.

According to the above configuration, when the wheel is pushed outward in the car longitudinal direction by the operation of the wheel tread brake, and with this, the axle beam is about to be largely displaced outward in the car longitudinal direction relative to the core rod, the stopper portion of the axle beam interferes with the core rod or the bogie frame. This limits excessive displacement of the axle beam outward in the car longitudinal direction relative to the core rod during the operation of the wheel tread brake, and also prevents excessive distortion of the elastic bushing. Since the stopper portion is provided at the axle beam and can be visually confirmed from outside without disassembling the bogie, inspection is easy. Moreover, since the elastic bushing does not have to have a special structure, an increase in cost is suppressed. Therefore, the excessive distortion of the elastic bushing, interposed between the axle beam and the core rod, in the car longitudinal direction can be prevented. Furthermore, the increase in cost can be suppressed, and the inspection can be easily performed.

Advantageous Effects of Invention

According to the present invention, the excessive distortion of the elastic bushing, interposed between the axle beam and the core rod, in the car longitudinal direction can be prevented. Moreover, the increase in cost can be suppressed, and the inspection can be easily performed.

DESCRIPTION OF EMBODIMENTS

Hereinafter, embodiments will be described with reference to the drawings. In the following description, a direction in which a railcar travels is defined as a car longitudinal direction (front-rear direction), and a lateral direction perpendicular to the car longitudinal direction is defined as a car width direction (left-right direction).

Embodiment 1

Figure 1:
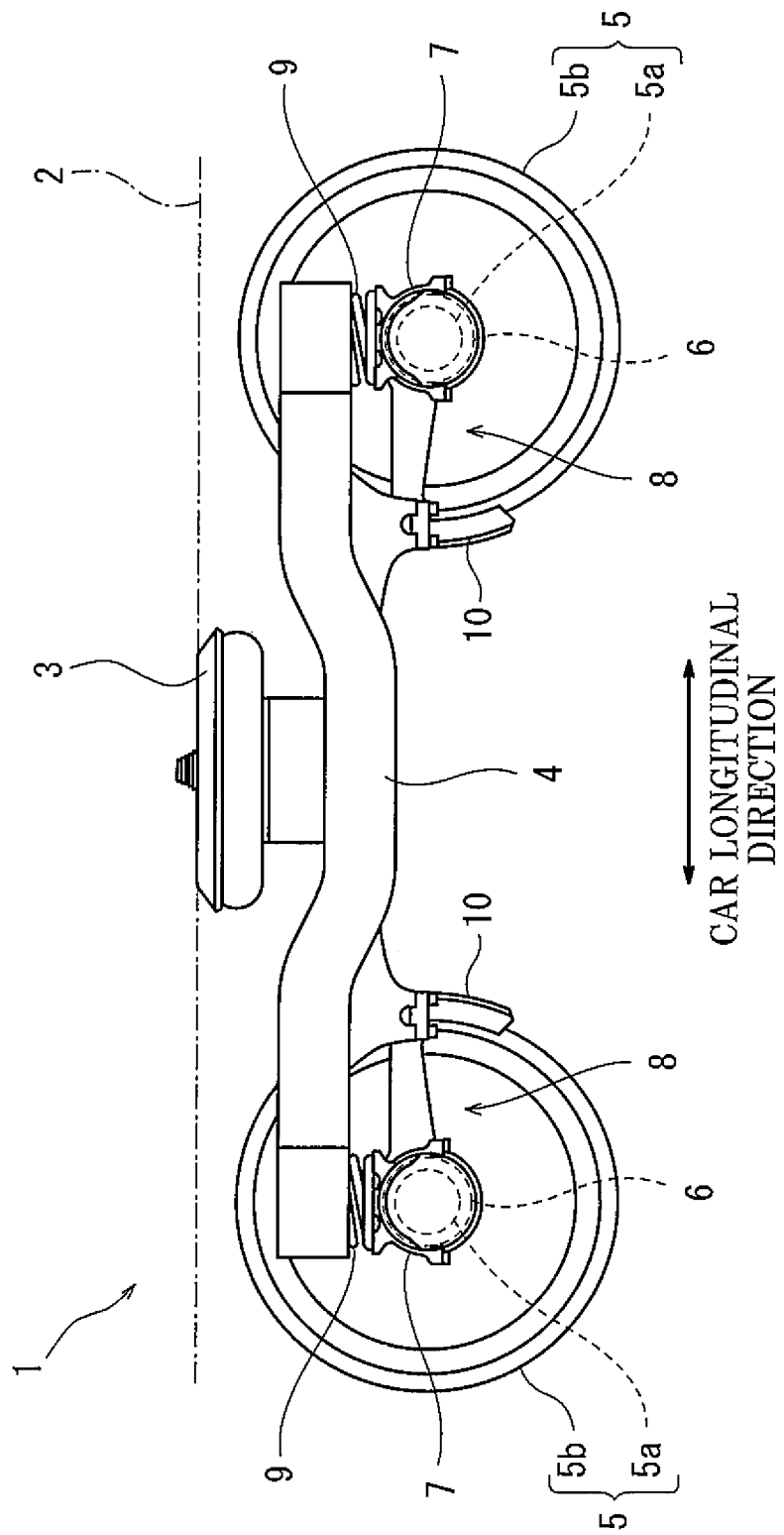
FIG. 1 is a side view of a bogie of a railcar according to Embodiment 1 when viewed from a car width direction.

FIG. 1 is a side view of a bogie 1 of a railcar according to Embodiment 1 when viewed from the car width direction. As shown in FIG. 1, the bogie 1 includes a bogie frame 4 supporting a car body 2 through secondary suspensions 3 (air springs, for example). A pair of wheelsets 5 are arranged at both sides of the bogie frame 4 in the car longitudinal direction. Each of the wheelsets 5 includes an axle 5a and wheels 5b. The axle 5a extends in the car width direction, and the wheels 5b are provided at both side portions of the axle 5a.

Both end portions of the axle 5a in the car width direction are accommodated in axle boxes 7 through bearings 6. The axle boxes 7 are coupled to the bogie frame 4 through axle beam type axle box suspensions 8. Each of primary suspensions 9 (coil springs, for example) is interposed between the bogie frame 4 and the axle box 7. Wheel tread brakes 10 are arranged at positions opposed to wheel treads of the wheels 5b. The wheel tread brakes 10 press the wheel treads of the wheels 5b from an inner side toward an outer side in the car longitudinal direction.

Figure 2:
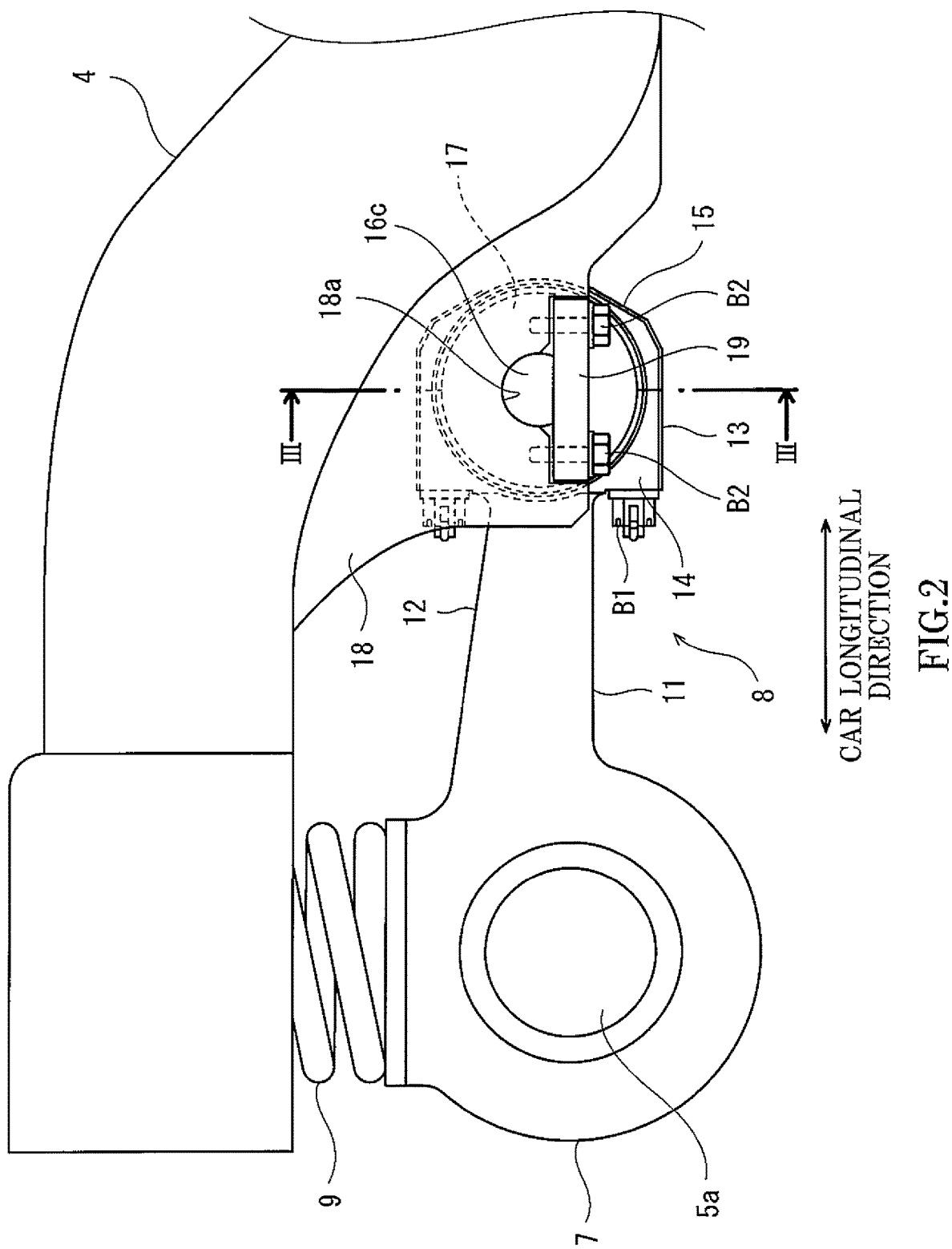
FIG. 2 is a side view of an axle box suspension of the bogie shown in FIG. 1.

FIG. 2 is a side view of the axle box suspension 8 of the bogie 1 shown in FIG. 1. As shown in FIG. 2, the axle box suspension 8 includes an axle beam 11 coupling the axle box 7 to the bogie frame 4. The axle beam 11 includes a beam portion 12 and a tubular portion 13. The beam portion 12 extends integrally from the axle box 7 toward a bogie middle side in the car longitudinal direction, and the tubular portion 13 is provided at a tip end of the beam portion 12. The tubular portion 13 includes a cylindrical inner peripheral surface having an axis directed in the car width direction and is open toward both sides in the car width direction.

The tubular portion 13 is divided into two parts in the car longitudinal direction. Specifically, the tubular portion 13 is divided into a first semi-tubular portion 14 and a second semi-tubular portion 15. The first semi-tubular portion 14 is integrally provided at the tip end of the beam portion 12. The second semi-tubular portion 15 is formed separately from the first semi-tubular portion 14 and stacked on the first semi-tubular portion 14 from the inner side in the car longitudinal direction. The second semi-tubular portion 15 is fixed to the first semi-tubular portion 14 by fasteners B1 (bolts and nuts, for example).

Figure 3:
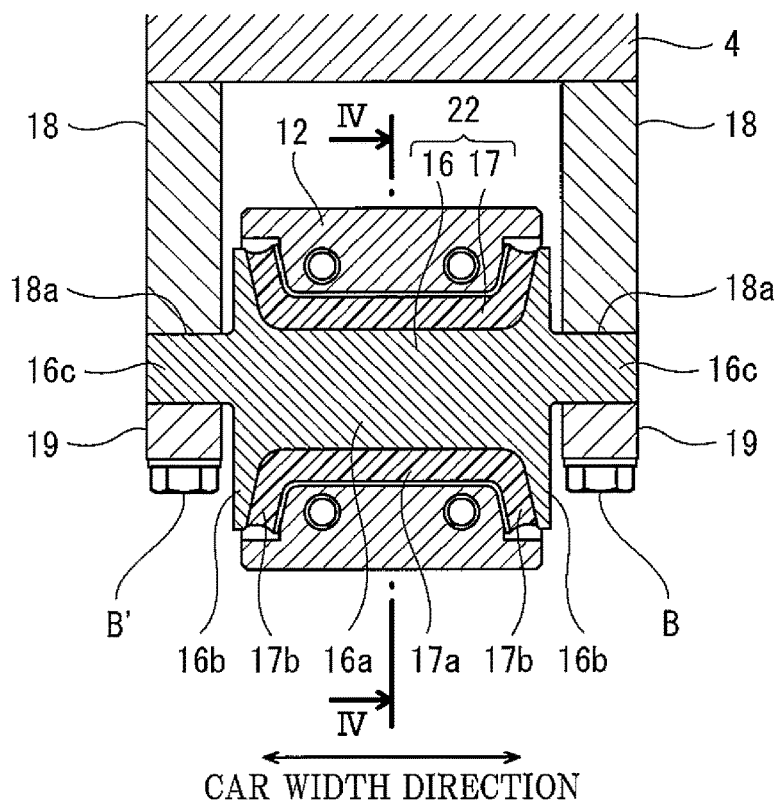
FIG. 3 is a sectional view taken along line III-III of FIG. 2.

FIG. 3 is a sectional view taken along line III-III of FIG. 2. As shown in FIGS. 2 and 3, a core rod 16 is inserted into an internal space of the tubular portion 13. The core rod 16 includes a columnar portion 16a, a pair of conical flange portions 16b, and protruding portions 16c. The pair of flange portions 16b are provided at both sides of the columnar portion 16a in the car width direction. The protruding portions 16c protrude outward in the car width direction from side surfaces of the pair of flange portions 16b. The protruding portions 16c protrude from the tubular portion 13 toward both sides in the car width direction.

An elastic bushing 17 is interposed between the tubular portion 13 and the core rod 16. The elastic bushing 17 is, for example, a rubber bushing. The elastic bushing 17 includes a cylindrical portion 17a and a pair of conical flange portions 17b. The pair of flange portions 17b are provided at both sides of the cylindrical portion 17a in the car width direction. The elastic bushing 17 is externally fitted to the core rod 16 and joined to the core rod 16 by vulcanized adhesion. To be specific, the core rod 16 and the elastic bushing 17 which are integrated with each other constitute an elastic bushing shaft body 22. The cylindrical portion 17a of the elastic bushing 17 is adhered to the columnar portion 16a of the core rod 16. The flange portions 17b of the elastic bushing 17 are adhered to the flange portions 16b of the core rod 16. The first semi-tubular portion 14 and the second semi-tubular portion 15 are fixed to each other by the fasteners B1, and with this, sandwich the core rod 16 through the elastic bushing 17. By the elasticity of the elastic bushing 17, the tubular portion 13 is allowed to be displaced relative to the core rod 16 in front-rear, left-right, and upper-lower directions and a rotational direction about an axis extending in the car width direction.

A pair of receiving seats 18 are provided at the bogie frame 4 so as to protrude downward. Groove portions 18a are formed at the pair of receiving seats 18. The groove portions 18a are open downward and toward both sides in the car width direction. The protruding portions 16c of the core rod 16 are fitted into the groove portions 18a from below. In this state, lid members 19 support lower surfaces of the protruding portions 16c of the core rod 16 and are fixed to the receiving seats 18 by fasteners B2 (bolts, for example) from below.

Figure 4:
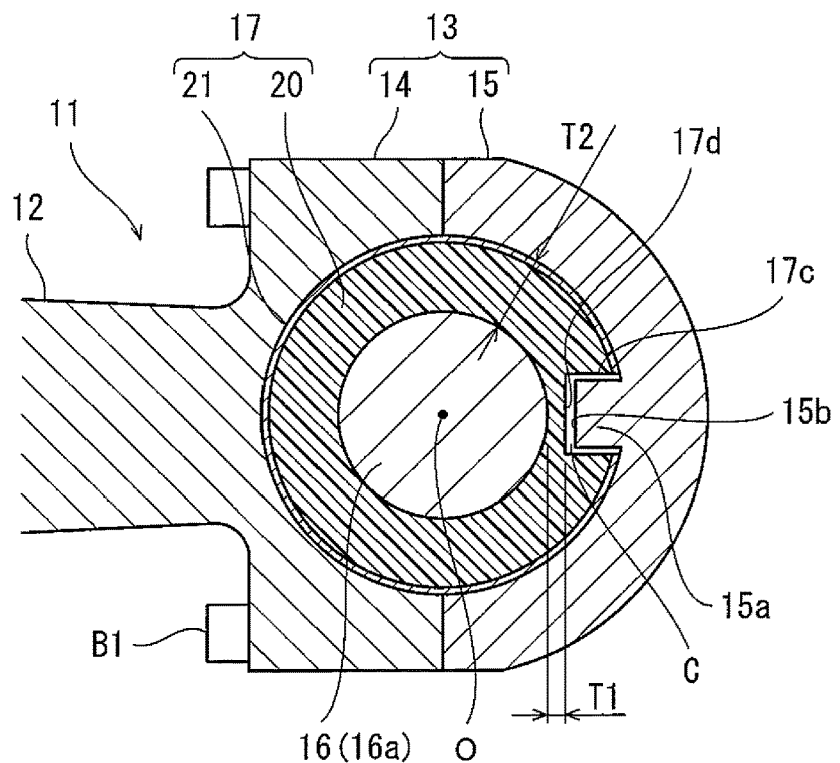
FIG. 4 is a sectional view taken along line IV-IV of FIG. 3.
Figure 5:
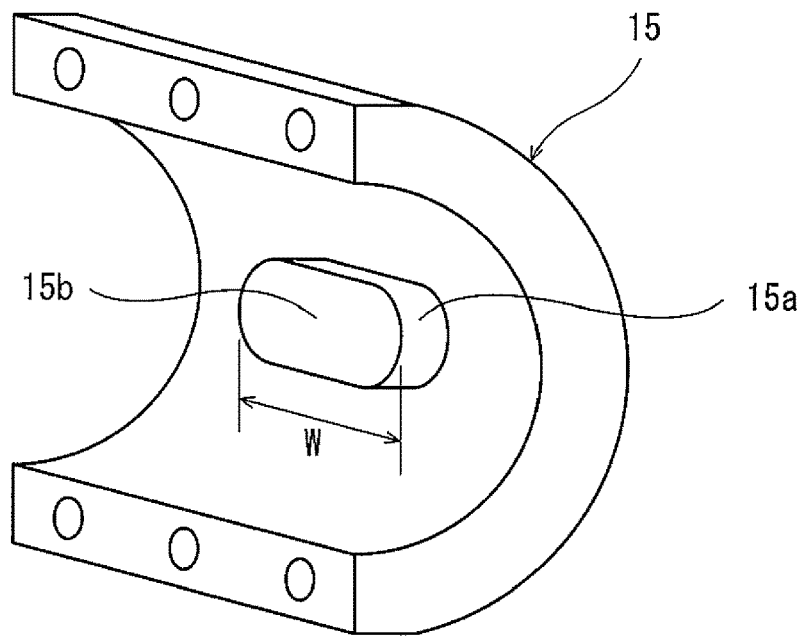
FIG. 5 is a perspective view of a second semi-tubular portion of FIG. 4 when viewed from an inner peripheral surface side.

FIG. 4 is a sectional view taken along line IV-IV of FIG. 3. FIG. 5 is a perspective view of the second semi-tubular portion 15 of FIG. 4 when viewed from an inner peripheral surface side. As shown in FIGS. 4 and 5, the elastic bushing 17 includes, for example, a tubular rubber tube main body 20 and a tubular outer shell 21 covering an outer peripheral surface of the rubber tube main body 20. The elastic bushing 17 includes a recess 17c at a portion of an outer peripheral surface of the elastic bushing 17 which portion is located at the inner side in the car longitudinal direction. The recess 17c is recessed outward in the car longitudinal direction. A thickness T1 of the elastic bushing 17 at the recess 17c in a radial direction is equal to or less than half a thickness T2 of a portion of the elastic bushing 17 in the radial direction which portion is located adjacent to the recess 17c, preferably 40% or less of the thickness T2, more preferably 30% or less of the thickness T2.

The second semi-tubular portion 15 includes a convex stopper portion 15a. The stopper portion 15a protrudes outward in the car longitudinal direction from a part of the inner peripheral surface of the second semi-tubular portion 15 which part is located at the inner side in the car longitudinal direction. The stopper portion 15a includes a tip end surface 15b facing outward in the car longitudinal direction. The shape of the tip end surface 15b is not especially limited. In the present embodiment, the tip end surface 15b of the stopper portion 15a has such a shape as to be long in a longitudinal direction of the core rod 16 (i.e., in the car width direction). The shape of the tip end surface 15b may be an oval, an ellipse, a quadrangle, or the like. For example, the tip end surface 15b of the stopper portion 15a may be a curved surface corresponding to the outer peripheral surface of the core rod 16, and with this, a pressure receiving area of the tip end surface 15b opposed to the core rod 16 may be increased. Moreover, the stopper portion 15a may be a separate structure fixed to the semi-tubular portion 15 by fitting or fastening. The stopper portion 15a is arranged at the same height as a center axis of the core rod 16 and is horizontally opposed to a vertical center of the core rod 16 from the inner side (bogie middle side) in the car longitudinal direction.

With the second semi-tubular portion 15 fixed to the first semi-tubular portion 14, the stopper portion 15a is inserted into the recess 17c with a gap C between a bottom surface 17d of the recess 17c of the elastic bushing 17 and the tip end surface 15b. A maximum length of the tip end surface 15b in a surface direction of the tip end surface 15b is 25% or more of an outer diameter of the columnar portion 16a of the core rod 16, preferably 30% or more, more preferably 40% or more. In the present embodiment, since the tip end surface 15b is oval, a width W of the tip end surface 15b in the surface direction (i.e., a width of the tip end surface 15b in the car width direction) is 25% or more of the outer diameter of the columnar portion 16a, preferably 30% or more, more preferably 40% or more. When the tip end surface 15b of the stopper portion 15a has such a shape as to extend in the longitudinal direction of the core rod 16 (i.e., in the car width direction) as in the present embodiment, the pressure receiving area of the stopper portion 15a which receives pressure from the core rod 16 can be suitably increased.

According to the above-described configuration, when the wheel 5b is pushed outward in the car longitudinal direction by the operation of the wheel tread brake 10, and with this, the axle beam 11 is about to be largely displaced outward in the car longitudinal direction relative to the core rod 16, the tip end surface 15b of the stopper portion 15a of the tubular portion 13 of the axle beam 11 presses the bottom surface 17d of the recess 17c of the elastic bushing 17 to receive reaction from the core rod 16 inward in the car longitudinal direction. This limits excessive displacement of the axle beam 11 outward in the car longitudinal direction relative to the core rod 16 during the operation of the wheel tread brake 10, and also prevents excessive distortion of the rubber tube main body 20 of the elastic bushing 17. Therefore, a spring constant of the elastic bushing 17 can be made small, and travelling performance can be improved. Moreover, since there is the gap C between the stopper portion 15a and the bottom surface 17d of the recess 17c, the stopper portion 15a does not inhibit the elastic deformation of the elastic bushing 17 in the car longitudinal direction while the wheel tread brake 10 is not operating.

The stopper portion 15a including the tip end surface 15b is provided at the tubular portion 13 of the axle beam 11 and is higher in strength than the elastic bushing 17. Therefore, even when the stopper portion 15a and the elastic bushing 17 contact each other, the elastic bushing 17 which is lower in cost than the stopper portion 15a can serve as a damaged portion. Moreover, since the structure of the elastic bushing 17 is not complex, an increase in cost is suppressed. Therefore, excessive distortion of the elastic bushing 17, interposed between the axle beam 11 and the core rod 16, in the car longitudinal direction can be prevented, and the increase in cost can be suppressed.

Moreover, the maximum length of the tip end surface 15b in the surface direction is 25% or more of the outer diameter of the columnar portion 16a of the core rod 16. Therefore, it is possible to prevent a case where when the wheel tread brake 10 operates, and the tip end surface 15b of the stopper portion 15a receives the reaction from the core rod 16, force per unit area received by the tip end surface 15b becomes excessive. Thus, the durability of the stopper portion 15a and the durability of the elastic bushing 17 can be increased. Furthermore, the stopper portion 15a and the recess 17c can also serve as a positioning pin which prevents the elastic bushing 17 from turning relative to the tubular portion 13. Therefore, a positioning pin does not have to be additionally provided.

Figure 6:
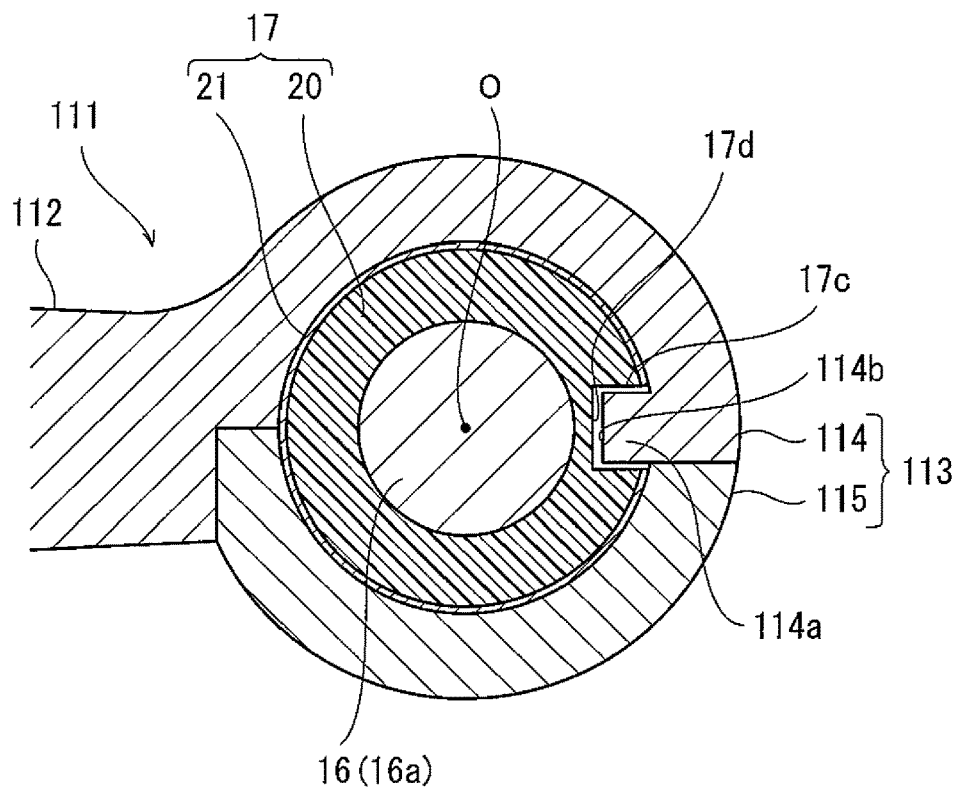
FIG. 6 is a diagram showing a modified example and corresponding to FIG. 5.

FIG. 6 is a diagram showing a modified example and corresponding to FIG. 4. As shown in FIG. 6, as the modified example, a tubular portion 113 of an axle beam 111 may be divided into upper and lower parts. The tubular portion 113 is divided into a first semi-tubular portion 114 and a second semi-tubular portion 115. The first semi-tubular portion 114 is provided integrally at a tip end of a beam portion 112. The second semi-tubular portion 115 is formed separately from the first semi-tubular portion 114 and stacked on the first semi-tubular portion 114 from below. The second semi-tubular portion 115 is fixed to the first semi-tubular portion 114 by fasteners (not shown). It should be noted that the positions of the first semi-tubular portion 114 and the second semi-tubular portion 115 may be reversed in the upper-lower direction.

The first semi-tubular portion 114 includes a stopper portion 114a. The stopper portion 114a protrudes outward in the car longitudinal direction from a part of an inner peripheral surface of the first semi-tubular portion 114 which part is located at the inner side in the car longitudinal direction. The stopper portion 114a includes a tip end surface 114b facing outward in the car longitudinal direction. Since the stopper portion 114a is arranged at the same height as a center axis O of the core rod 16, a part of the first semi-tubular portion 114 at which part the stopper portion 114a is provided protrudes downward beyond the center axis O of the core rod 16. Since the other components are the same as those in Embodiment 1, explanations thereof are omitted. Moreover, a first semi-tubular portion and a second semi-tubular portion may be formed so as to be separable in the upper-lower direction from each other along a horizontal line passing through the center axis of the core rod, and a stopper portion may be formed so as to be divided into a first half stopper portion provided at the first semi-tubular portion and a second half stopper portion provided at the second semi-tubular portion. In this case, the stopper portion may have such a shape that the first semi-tubular portion and the second semi-tubular portion can be detached from each other in the upper-lower direction without interfering with the elastic bushing.

Embodiment 2

Figure 7:
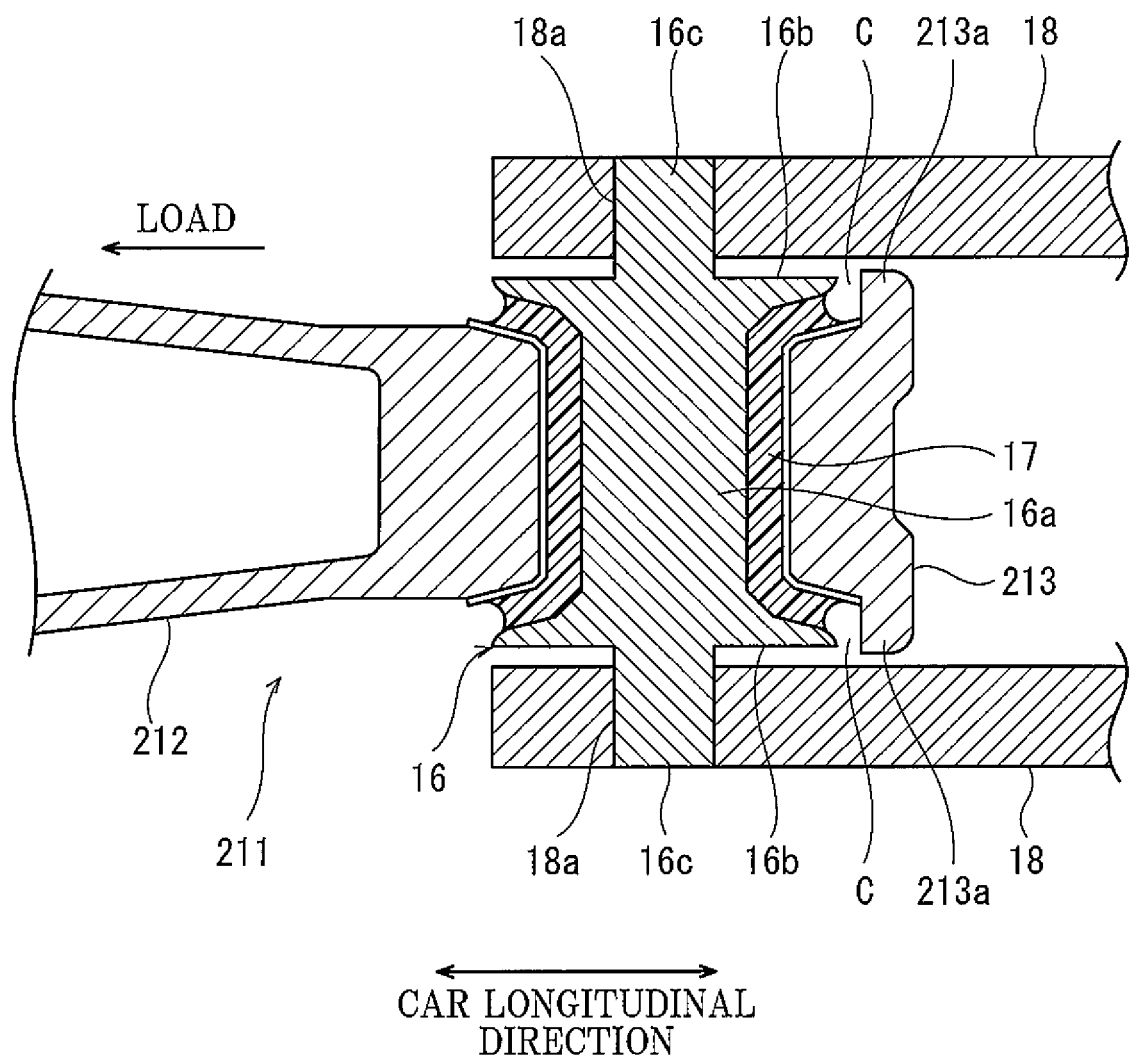
FIG. 7 is a horizontal sectional view showing a tubular portion of the axle beam according to Embodiment 2 and its vicinity.
Figure 8:
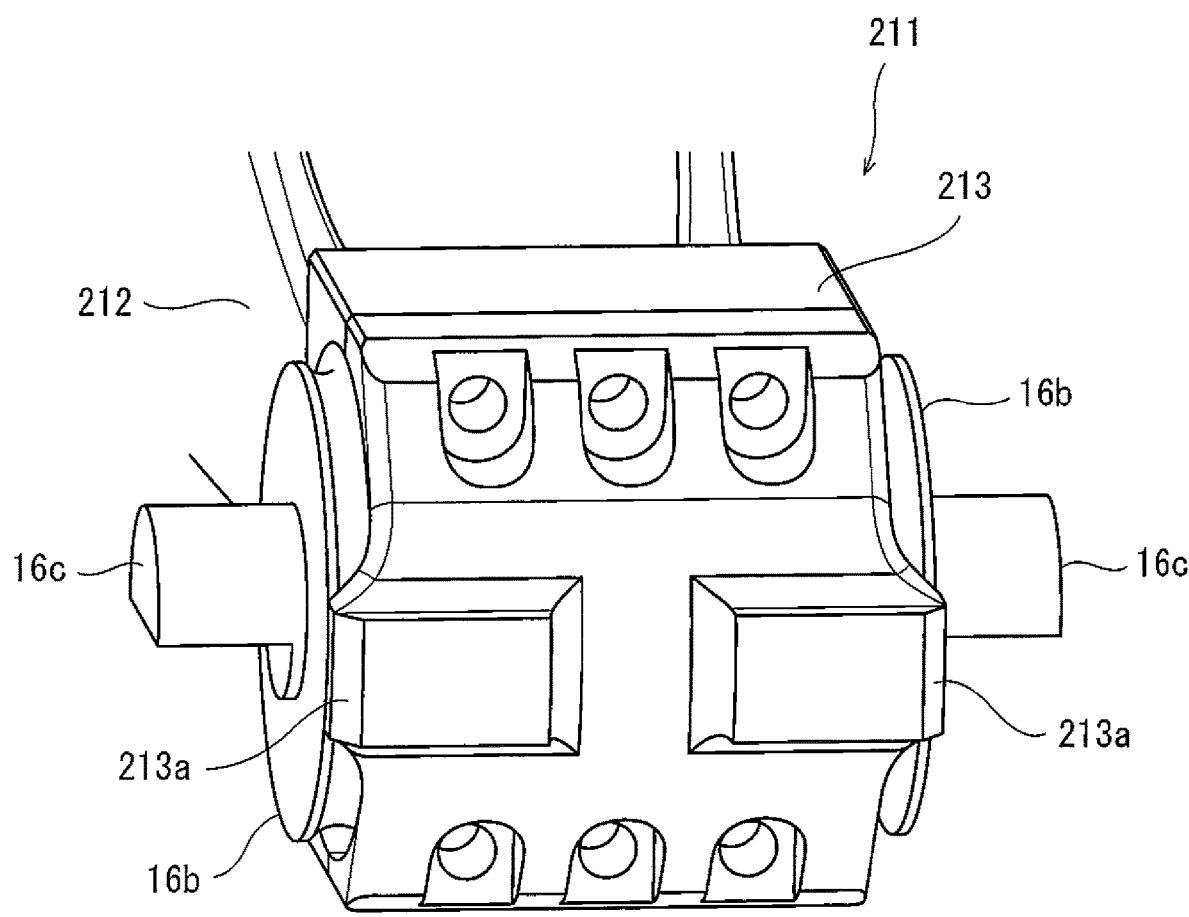
FIG. 8 is a perspective view showing the tubular portion of FIG. 7 and its vicinity.

FIG. 7 is a horizontal sectional view showing a tubular portion 213 of an axle beam 211 according to Embodiment 2 and its vicinity. FIG. 8 is a perspective view showing the tubular portion 213 of FIG. 7 and its vicinity. It should be noted that the same reference signs are used for the same components as in Embodiment 1, and a repetition of the same explanation is avoided. As shown in FIGS. 7 and 8, in Embodiment 2, the axle beam 211 includes a beam portion 212 and the tubular portion 213. The tubular portion 213 includes stopper portions 213a configured to prevent excessive displacement of the axle beam 211 relative to the core rod 16 during the operation of the wheel tread brake 10 (see FIG. 1). Each of the stopper portions 213a is opposed to the corresponding flange portion 16b of the core rod 16 from the inner side in the car longitudinal direction with the gap C in the car longitudinal direction, the flange portion 16b projecting outward in the car width direction beyond the elastic bushing 17. Specifically, the stopper portions 213a protrude toward both sides in the car width direction from a tip end portion of the tubular portion 213, the tip end portion being located at the inner side (bogie middle side) in the car longitudinal direction. In the present embodiment, the stopper portion 213a is formed to be larger in thickness than a part of the tubular portion 213 which part is located adjacent to the stopper portion 213a. The size of the gap C between the stopper portion 213a and the flange portion 16b of the core rod 16 in the car longitudinal direction is smaller than the thickness of the elastic bushing 17.

According to this configuration, when the wheel 5b (see FIG. 1) is pushed outward in the car longitudinal direction by the operation of the wheel tread brake 10 (see FIG. 1), and with this, the axle beam 211 is about to be largely displaced outward in the car longitudinal direction relative to the core rod 16, the stopper portions 213a of the tubular portion 213 of the axle beam 211 interfere with the flange portions 16b of the core rod 16. This limits excessive displacement of the axle beam 211 outward in the car longitudinal direction relative to the core rod 16 during the operation of the wheel tread brake 10, and also prevents excessive distortion of the elastic bushing 17. Therefore, the spring constant of the elastic bushing 17 can be made small, and the travelling performance can be improved.

Since the stopper portions 213a are provided at the axle beam 211 and can be visually confirmed from outside without disassembling the bogie, inspection is easy. Moreover, since the elastic bushing 17 does not have to have a special structure, an increase in cost is suppressed. Therefore, excessive distortion of the elastic bushing 17, interposed between the axle beam 211 and the core rod 16, in the car longitudinal direction can be prevented. Furthermore, the increase in cost can be suppressed, and the inspection can be easily performed.

It should be noted that the tubular portion 213 may be divided into left and right parts, may be divided into upper and lower parts, or may not be divided. The stopper portions 213a do not necessarily have to be provided at the tubular portion 213. For example, a stopper portion may be provided at the beam portion 212 of the axle beam 211, and when the axle beam 211 is about to be excessively displaced outward in the car longitudinal direction relative to the core rod 16 (and the bogie frame 4), the stopper portion may interfere with the bogie frame 4 (for example, the receiving seat 18). Furthermore, the bogie 1 may be configured such that: plate springs are used as the primary suspensions 9 instead of the coil springs; side sills are omitted from the bogie frame; both longitudinal direction end portions of each plate spring are supported by a pair of front and rear axle boxes 7 from below; and longitudinal direction middle portions of the plate springs support a cross beam of the bogie frame from below.

REFERENCE SIGNS LIST 1 bogie
4 bogie frame
5b wheel
7 axle box
8 axle box suspension
10 wheel tread brake
11, 111, 211 axle beam
12, 112, 212 beam portion
13, 113, 213 tubular portion
15a, 114a, 213a stopper portion
15b, 114b tip end surface
16 core rod
16a columnar portion
16b flange portion
16c protruding portion
17 elastic bushing
17c recess
17d bottom surface
22 elastic bushing shaft body
C gap

The invention claimed is:

1. An axle box suspension of a railcar, the axle box suspension coupling an axle box to a bogie frame of a bogie including a wheel tread brake configured to press a wheel tread of a wheel from an inner side in a car longitudinal direction, the axle box suspension comprising:

an axle beam including a beam portion and a tubular portion and coupling the axle box to the bogie frame, the beam portion extending in the car longitudinal direction from the axle box, the tubular portion being provided at a tip end of the beam portion and open toward both sides in a car width direction;

a core rod inserted into an internal space of the tubular portion and including a pair of protruding portions, the pair of protruding portions protruding toward both sides in the car width direction and being supported by the bogie frame; and
a tubular elastic bushing interposed between the tubular portion and the core rod, wherein:
the elastic bushing includes a recess at a portion of an outer peripheral surface of the elastic bushing which portion is located at the inner side in the car longitudinal direction, the recess being recessed outward in the car longitudinal direction;
the tubular portion includes a convex stopper portion protruding outward in the car longitudinal direction from a part of an inner peripheral surface of the tubular portion which part is located at the inner side in the car longitudinal direction, the stopper portion being inserted into the recess with a gap between the stopper portion and a bottom surface of the recess; and
a thickness of the elastic bushing at the recess in a radial direction is equal to or less than half a thickness of a portion of the elastic bushing in the radial direction which portion is located adjacent to the recess.

2. The axle box suspension according to claim 1, wherein a maximum length of a tip end surface of the stopper portion in a surface direction of the tip end surface is 25% or more of an outer diameter of a portion of the core rod which portion is located at the same position as the recess in the car width direction.

3. An elastic bushing shaft body inserted into a tubular portion provided at a tip end of a beam portion of an axle beam in a bogie including a wheel tread brake configured to press a wheel tread of a wheel from an inner side in a car longitudinal direction, the axle beam coupling a bogie frame and an axle box, the beam portion extending from the axle box in the car longitudinal direction, the tubular portion being open toward both sides in a car width direction,
the elastic bushing shaft body comprising:
a core rod including a pair of protruding portions, the pair of protruding portions protruding toward both sides in the car width direction and being supported by the bogie frame; and
a tubular elastic bushing externally fitted to the core rod, wherein:
the elastic bushing includes a recess at a portion of an outer peripheral surface of the elastic bushing which portion is located at the inner side in the car longitudinal direction, the recess being recessed outward in the car longitudinal direction, a convex stopper portion being inserted into the recess with a gap between the stopper portion and a bottom surface of the recess, the stopper portion protruding outward in the car longitudinal direction from a part of an inner peripheral surface of the tubular portion which part is located at the inner side in the car longitudinal direction; and
a thickness of the elastic bushing at the recess in a radial direction is equal to or less than half a thickness of a portion of the elastic bushing in the radial direction which portion is located adjacent to the recess.

4. An axle box suspension of a railcar, the axle box suspension coupling an axle box to a bogie frame of a bogie including a wheel tread brake configured to press a wheel tread of a wheel from an inner side in a car longitudinal direction,
the axle box suspension comprising:
an axle beam including a beam portion and a tubular portion and coupling the axle box to the bogie frame, the beam portion extending in the car longitudinal direction from the axle box, the tubular portion being provided at a tip end of the beam portion and open toward both sides in a car width direction;
a core rod inserted into an internal space of the tubular portion and including a pair of protruding portions, the pair of protruding portions protruding toward both sides in the car width direction and being supported by the bogie frame; and
a tubular elastic bushing interposed between the tubular portion and the core rod, wherein:
the axle beam includes a stopper portion opposed in the car longitudinal direction to the core rod or a part of the bogie frame from the inner side in the car longitudinal direction with an open space between the stopper portion and the core rod or between the stopper portion and the part of the bogie frame; and
a size of the open space in the car longitudinal direction is smaller than a thickness of the elastic bushing.

5. The axle box suspension according to claim 4, wherein:
the stopper portion protrudes in the car width direction from a part of the tubular portion which part is located at the inner side in the car longitudinal direction; and
the stopper portion is opposed in the car longitudinal direction to a portion of the core rod with the open space, the portion of the core rod projecting outward in the car width direction beyond the elastic bushing.

6. The axle box suspension according to claim 5, wherein the stopper portion partially protrudes in the car width direction from the part of the tubular portion.

7. The axle box suspension according to claim 4, wherein the elastic bushing is not in the open space.

* * * * *